(12) United States Patent
Gordon et al.

(10) Patent No.: US 7,913,317 B2
(45) Date of Patent: Mar. 29, 2011

(54) WET/DRY SUIT WITH KNITTED WOOL LAYERS

(76) Inventors: John Gordon, Lytham St. Annes (GB); Corey Gordon, Thorndon (NZ)

( * ) Notice: Subject to any disclaimer, the term of this patent is extended or adjusted under 35 U.S.C. 154(b) by 0 days.

(21) Appl. No.: 10/544,268

(22) PCT Filed: Feb. 3, 2004

(86) PCT No.: PCT/GB2004/000418
§ 371 (c)(1),
(2), (4) Date: Jul. 24, 2006

(87) PCT Pub. No.: WO2004/069649
PCT Pub. Date: Aug. 19, 2004

(65) Prior Publication Data
US 2006/0260018 A1 Nov. 23, 2006

(30) Foreign Application Priority Data

Feb. 3, 2003 (GB) .................................. 0302405.6
Jun. 7, 2003 (GB) .................................. 0313121.6
Nov. 13, 2003 (GB) .................................. 0326429.8

(51) Int. Cl.
*B63C 11/04* (2006.01)
*B63C 11/10* (2006.01)
*B63C 11/02* (2006.01)
(52) U.S. Cl. .................. 2/2.15; 2/2.16; 2/2.17
(58) Field of Classification Search ............... 2/2.15, 2/2.16, 2.17
See application file for complete search history.

(56) References Cited

U.S. PATENT DOCUMENTS

| 412,784 | A | | 10/1889 | Orr | |
|---|---|---|---|---|---|
| 292,299 | A | | 6/1928 | Le Brocq | |
| 600,803 | A | | 6/1944 | Platt | |
| 2,749,551 | A | | 6/1956 | Garbellano | |
| 2,981,954 | A | * | 5/1961 | Garbellano | 2/2.17 |
| 3,081,517 | A | | 3/1963 | Driesch | |
| 3,337,876 | A | * | 8/1967 | Armstrong | 2/2.15 |
| 3,660,849 | A | * | 5/1972 | Jonnes et al. | 2/2.15 |
| 4,274,158 | A | * | 6/1981 | Pogorski et al. | 2/2.16 |
| 4,276,341 | A | * | 6/1981 | Tanaka | 442/183 |
| 4,438,531 | A | * | 3/1984 | Long et al. | 2/2.15 |
| 4,631,755 | A | | 12/1986 | Zingg | |
| 4,710,978 | A | * | 12/1987 | Pankopf | 2/2.16 |

(Continued)

FOREIGN PATENT DOCUMENTS

DE 01679841 U 7/1954
(Continued)

OTHER PUBLICATIONS http://www.woolisbest.com/wool_explained/index.html; Wool Explained.*

(Continued)

*Primary Examiner* — Bobby H Muromoto, Jr.
(74) *Attorney, Agent, or Firm* — McKee, Voorhees & Sease, P.L.C.

(57) ABSTRACT

A suit for use to be worn by a person when immersed in water or in contact with water and may be provided, for example, as a wetsuit construction or a dry suit construction. The suit includes an outer layer typically of a rubber foam construction and in accordance with the invention there is provided on the inner side of said layer, at least one portion of the suit, a layer of wool (8) or wool blended with other material. This inner wool (8) containing layer typically lies in contact with the wearer. In one embodiment the wool used is that obtained from Merino sheep which is found to be particularly well suited.

14 Claims, 2 Drawing Sheets

U.S. PATENT DOCUMENTS

Figure 1:
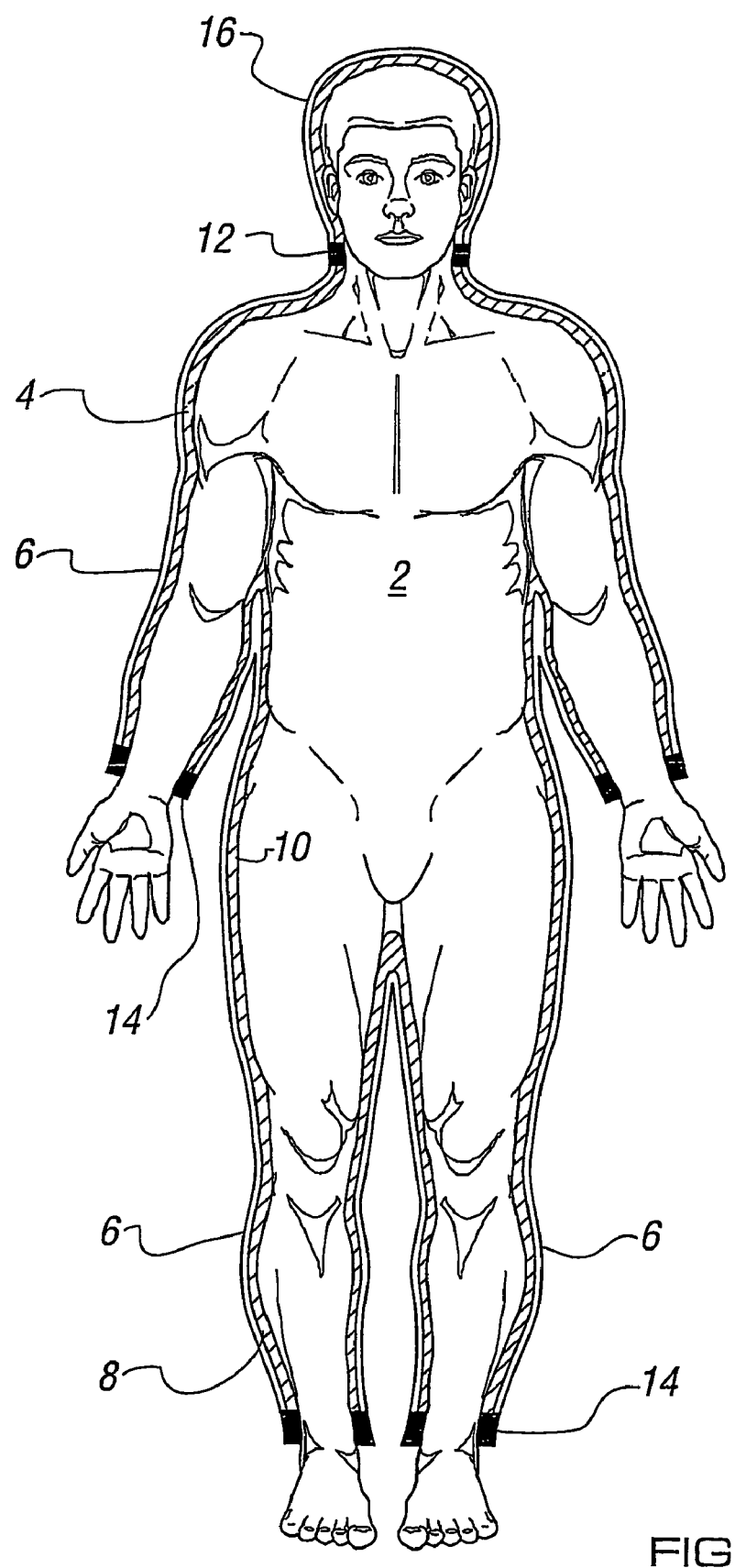

| | | | |
|---|---|---|---|
| 4,833,729 A * | 5/1989 | Fox et al. | 441/102 |
| 4,999,845 A * | 3/1991 | Jenks et al. | 2/2.16 |
| 5,022,878 A * | 6/1991 | Casad | 441/103 |
| 5,196,240 A * | 3/1993 | Stockwell | 427/389.9 |
| 5,361,411 A * | 11/1994 | Bohn et al. | 2/69 |
| 5,631,074 A * | 5/1997 | Herlihy, Jr. | 442/35 |
| 5,924,134 A * | 7/1999 | Taylor et al. | 2/81 |
| 5,953,750 A * | 9/1999 | Stella | 2/2.15 |
| 6,244,784 B1 * | 6/2001 | Gordon | 405/186 |
| 6,324,703 B1 * | 12/2001 | Chen | 2/458 |
| 6,332,221 B1 * | 12/2001 | Gracey | 2/69 |
| 6,708,528 B2 * | 3/2004 | Chuang | 66/171 |
| 2002/0023283 A1 | 2/2002 | Kania | |
| 2003/0008576 A1 | 1/2003 | Kawashima | |
| 2003/0140391 A1 * | 7/2003 | Richards et al. | 2/67 |

FOREIGN PATENT DOCUMENTS

| | | |
|---|---|---|
| DE | 01726806 U | 7/1956 |
| DE | 8430625 U1 | 2/1985 |
| DE | 297 22 849 U1 | 4/1998 |
| EP | 0 526 377 A1 | 2/1993 |
| EP | 1 006 228 A1 | 6/2000 |
| EP | 1 277 652 A1 | 1/2003 |
| GB | 2 021 040 A | 11/1979 |

OTHER PUBLICATIONS http://www.fabulousyarn.com/merino_wool_yarn.shtml: What is merino wool and what is a merino sheep?.*

Weede, Jen, "Foundation for performance, '99 Show Issue, base layers' 1999-200 collection, Buyers Guide", Times Mirror Magazines Inc., 23(2):D19 (1999) 5 pages.

pp. 471-474 from a dictionary or encyclopedia. No date or title given.

p. 1207 from a dictionary. No date or title given.

PCT International Search—PCT/GB/2004/000418, Feb. 3, 2004, Gordon, John.

* cited by examiner

WET/DRY SUIT WITH KNITTED WOOL LAYERS

CROSS-REFERENCE TO RELATED APPLICATIONS

This application claims priority under 35 U.S.C. §119 to PCT/GB2004/000418 filed Feb. 3, 2004. Priority is also claimed to GB 0326429.8 filed Nov. 13, 2003, GB 0313121.6 filed Jun. 7, 2003, and GB 0302405.6 filed Feb. 3, 2003. These applications are hereby incorporated by reference in their entirety.

The invention to which this application relates is a suit for use in or in association with water, said suit being on occasion worn by a person in conjunction with other diving apparatus. For ease of reference, but in a non-limiting manner, the suit of the invention includes wetsuits, drysuits, emergency suits, deep diving suits and hereafter be referred to as a suit in this application.

There are typically two types of suits worn by persons who are participating in a leisure pursuit or sport either immersed within a body of water or on the surface of the body of water such as for example surfing, wind surfing or the like. It should therefor be appreciated that the advantages as described herein and in the co-pending patent applications, are applicable to both types, wet suits and dry suits, which are worn in any of these pursuits and indeed any form of suit such as emergency suits which are typically required to be worn by a person who is likely to come in contact with water during the pursuit of their leisure interest or sport.

The basic structure of a wet suit is provided to allow a limited amount of water to enter and be held within the suit to improve the insulation of the same and hence improve the warmth of the wearer. The water is not permitted to flush in and out of the wetsuit as, if this occurred, a large percentage of the retained diver heat energy would be lost. This control is typically achieved by the provision of relatively snug fitting cuffs in the wrist and ankles and a snug collar or attached hood around the neck or head. Zippers can also be provided and, in conjunction with sealing flaps, can be adjusted to limit the passage of water through the zipper and hence the wetsuit. A drysuit can be formed of similar materials but does not allow the passage of water into the same.

The suits are conventionally manufactured using closed cell foam rubber such as, for example, using neoprene or chloroprene. The foam rubber material includes closed cells which act to trap air or gas therein and afford thermal protection and benefit to the wearer. However, during diving, the water pressure increases on the suit and hence the rubber foam and acts to crush the closed cells in the material, reducing the volume of trapped air and depleting the thermal protection offered by the suit as the wearer descends. When one, considers that the water itself is likely to get colder as the wearer goes deeper, it will be appreciated that the wearer can experience discomfort due to the temperature drop and this can act as a limitation on the activities of the wearer. Typically, every 10 meters of added depth adds another atmosphere of pressure exerted on the suit and, as the majority of diving activity occurs at depths of 25-50 meters so the pressure exerted can be large and in the order of 11000 to 23000 lbs per square foot in that depth range. The effect of this on the rubber foam material used for the suit is to, for example, crush a 7 mm thick neoprene suit to under 2 mm at the 30 meter depth range, thereby significantly crushing the closed cells in the foam rubber and hence significantly reducing the thermal protection provided.

In addition to thermal loss due to the increase in pressure, another result of the crushing of the closed cells in the suit material is that there is a corresponding loss of buoyancy for the wearer as they descend. This buoyancy loss can be significant and, as a result, the diver is often required to wear a buoyancy compensator which is typically worn about the upper torso in a similar manner to a life jacket. As required, air is forced into the compensator from the divers air tank under the control of the diver. While the buoyancy compensator is effective it does represent another piece of apparatus required to be carried by the diver and can, in certain instances limit the degree of access which the diver has to certain confined areas. As such the buoyancy compensator is regarded as being necessary but inconvenient.

The aim of the present invention is to provide an improved wetsuit or drysuit for use on or in water and to provide the same in a configuration which allows the thermal advantage provided to the wearer to be improved, particularly when pressures of the extent discussed are exerted on the wetsuit. A further aim is to provide a suit which allows improved control of buoyancy by reducing the amount of air required to be introduced or exhaled.

In accordance with a first aspect of the invention there is provided a suit to be worn by a person in contact with water, said suit including an outer layer of material, and wherein at least a portion of the suit includes a layer of wool, or wool blended with other fibres or materials, which lies between the person and said layer of material.

In one embodiment, solely wool is provided but in alternative embodiments the wool can be provided mixed with other fibres or materials to add or provide specific features to the wool. For ease of reference hereonin, reference is made to wool alone, but it should be appreciated that the embodiments are equally applicable to all possible wool combinations and fall within the scope of this patent application.

Typically, the wool or wool blended material is positioned over portions which include any or any combination of the torso, legs and/or arms.

Variations can be made to the suit design to suit particular uses. For example, when the suit is provided for use on the surface of a body of water, the need for the seams of the suit to be watertight is reduced as the person wearing the suit may only come into irregular contact with the water and indeed may never actually be submersed within the body of water. Furthermore, as the tendency of the cells of the foam or rubber material to compress is not as great when the user is positioned at the surface of the body of water, a layer of foam or rubber, if provided, and/or wool/or wool blend, may be reduced, in thickness in comparison to a suit for wear by a person in an underwater activity.

With regard to a suit for use by a diver, the thickness of the wool and/or foam or neoprene layers may be increased to provide particular advantages to the person wearing the suit at greater depths in the body of water.

In one embodiment suit is a wetsuit and at least a portion or portions of said suit, water can pass between the inner surface of the said layer of material and the person wearing the suit. Typically the wool is provided at said portion or portions to lie between the person and the said material layer.

In one embodiment if water does enter the wet suit, the same will come into contact with the wool or wool blend.

In one embodiment, the wool is provided wherever water is permitted to pass between the diver and layer of material. Typically water is permitted to pass at the same locations as in a conventional wetsuit.

In one embodiment the layer of material of the suit is manufactured from conventional material such as neoprene or chloroprene. In one embodiment the wool is separate to the layer of material and worn as a separate layer, although the same may be attached to the said layer at one or several locations. However, more preferably the wool is provided attached, typically by lamination, to the inner surface of the layer of material so as to lie adjacent the diver's skin when the suit is worn.

Typically the wool is knitted provided in a laminated arrangement with the layer of material so as to provide an even thickness lining on the interior of the suit. When used in a wetsuit the wool acts to absorb and contain the water which is permitted to pass within the suit and between the layer of material and the wearer.

In a preferred embodiment the wool used is Merino wool.

In one embodiment the suit includes an outer layer, said outer layer formed of a suitable material to provide required protection from the external environment in which the suit is to be worn.

In one embodiment the wool is knitted into a layer and laminated to the foam rubber.

When used with the at least one further material or fibre, a blend of the wool and material is formed. One advantage is a gain in strength, especially if the material added is synthetic. A further feature is that by adding selected material or fibres, the cost of the wool containing, layer can be reduced by the use of material which is cheaper than the wool.

In one embodiment the wool blend includes a synthetic yarn in a proportion of about 1% to 40% by weight of the overall weight of the blend. However, this range should not be interpreted as limiting the scope of the application.

Another feature is to add a material to the wool which is at least partially elasticated to offer improved elasticity (stretch) to the layer and hence the suit.

In all cases the synthetic and/or other natural materials added to the wool are added in such a manner to ensure that the performance and advantages of added comfort, improved feel and look are maintained along with the inherent advantages of using a natural material.

In a further aspect of the invention there is provided a method of manufacturing a wetsuit or drysuit for use with water, said method comprising forming a layer of material to a shape for wearing by a person, and wherein a layer of wool or wool containing material is provided to lie between the person and the layer of material when the suit is worn.

Typically the method includes the step of laminating the wool material as a lining to the inner surface of the layer of material.

When in the form of a wetsuit the method includes the step of providing means in the said material to permit the flow of water between the inner surface of said layer and the divers skin when the wet suit is worn and providing control means to allow the control of the quantity of water and in a manner to ensure that the water passing into the area between the diver and the layer of material contacts and is absorbed by the wool material.

In a further aspect of the invention there is provided a wetsuit or drysuit for use with water, said suit including an outer layer of material and at least one inner portion formed of a knitted or woven material, said inner portion provided as an integral part of the suit or to be worn as an inner layer over which the outer layer of material is placed.

Typically the knitted or woven material includes a wool and other material or fibre, such as a synthetic yarn, blend.

In one embodiment the wool used is Merino wool and the synthetic yarn is any of the range of yarns available such as polyester and the like.

In whichever embodiment, the advantages of improved hygiene, the ability for the wet suit to be worn for a relatively long period of time, and the improved thermal capacity, all of which advantages are illustrated in greater detail in the co-pending applications are achieved and provided to the wearer of the wet suit, regardless of whether the wetsuit is worn and used on the surface or within the body of water.

Figure 2:
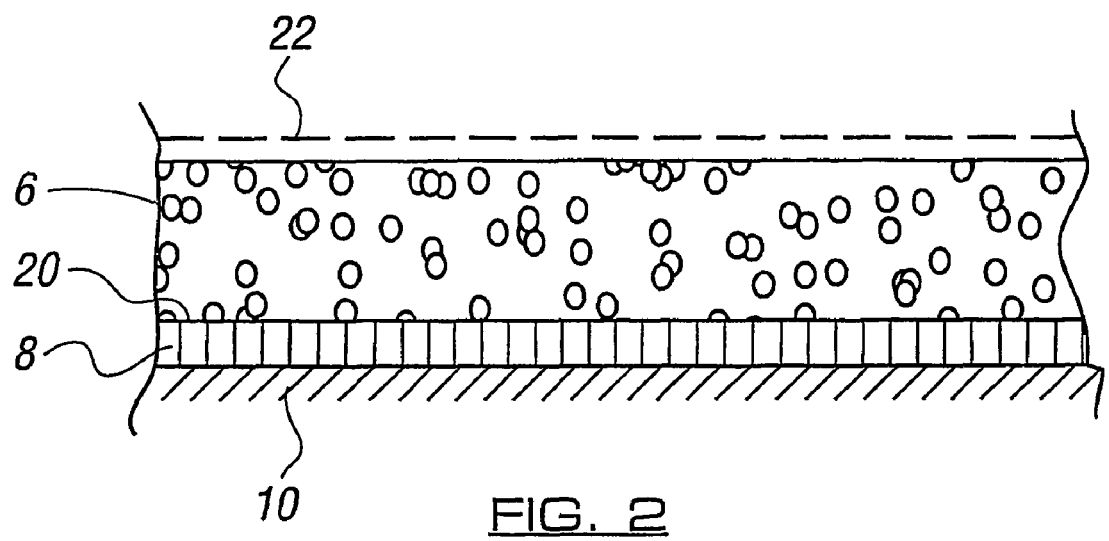

Specific embodiments of the invention are now described with reference to the accompanying drawings wherein, FIG. 1 illustrates a cross section of part of a wetsuit in accordance with the invention, being worn; and FIG. 2 illustrates a cross section through part of the wetsuit in accordance with the invention in more detail.

Referring now to FIG. 1 there is illustrated a wearer 2 wearing a suit 4 in accordance with one embodiment of the invention. In this case the example given is of a wetsuit however the same principles of the invention construction apply when provided as part of a drysuit. The FIG. 1 illustrates the suit with the wall of the same cut through in section for the purpose of illustration.

In accordance with the invention the wetsuit comprises, in this embodiment, a layer of neoprene or chloroprene 6 and on the inner surface of the same is a layer of Merino wool 8 laminated to the layer 6. The wool lining acts to at least partially absorb the water which passes between the inside of the layer 6 and the skin 10 of the wearer 2. The water is absorbed and held by the wool fibres to form a thermal barrier between the diver's skin and the rubber foam closed cells.

In the wetsuit form there is also included control zones in the form of smoothskin seals at the collar 12 and cuffs 14 which serve to restrict and prevent the flow of water in and out of the wetsuit at the extremities of the suit. The head portion 16, of the wetsuit is permanently attached or can be sealed with the same by the collar 12 and may also include, the wool lining 8. The control zones prevent the flushing of water in and out of the wetsuit and hence minimise heat loss and ensure that the water enters the interior of the wet suit in a controlled manner through "zippers" (not shown) at selected locations on the wetsuit.

FIG. 2 illustrates a typical portion of the material wall of the wetsuit in accordance with the invention in cross section.

The wall includes the layer of neoprene 6 with an "inner" surface 20 which, when worn, faces the divers skin 10. To this surface is laminated a wool layer, preferably knitted Merino wool, 8 which in turn contacts the divers skin 10. An outer protective layer 22 can also be provided as an option and can be laminated to the outer surface of the layer 6 as shown to improve the strength of the wetsuit.

Thus, in use, when worn, the wool layer faces and contacts the skin of the diver. The wool layer is typically knitted and laminated using standard gluing/laminating techniques, to the inner face of the rubber foam. The weight of the wool lining can be, but is not limited to, 50 to 500 grammes per square meter. The water, when it enters the area between the neoprene inner surface and the skin in which the wool lies is thus absorbed by the wool and this has several advantageous effects.

In the first instance the water and wool forms a layer of for example 3-5 mm, of substantially non-compressible water and wool. This layer and in particular the water held in the layer acts as a very efficient thermal barrier which, because it is substantially non compressible is not significantly acted upon the increased pressure as the depth of the diver in the water increases and therefore maintains its thermal efficiency at increasing depths. The water is absorbed by the wool layer and retained by the wool fibres to form the thermal barrier between the diver skin and the neoprene foam with the closed cells therein. As the wool is natural, the highly intricate surface scale structures that are inherent in the wool yarn is significantly better than the synthetic yarn surface structures which are substantially homogeneous.

Thermal testing at BTTG laboratories in Manchester UK has taken place using saturated 260 g/sq meter Merino wool lining in comparison with the densest most absorbent polyester loop pile lining of a similar or slightly heavier weight. The comparison has revealed that with thermal testing in saturated conditions on 7 mm neoprene the Merino wool/neoprene laminate was 35% more efficient with a TOG reading of 1.7 as opposed to the polyester loop pile/neoprene laminate that had a TOG rating of 1.26.

Furthermore the Merino wool lining will absorb typically a 0.5 mm to 3.0 mm layer of water into the fibre of the wool such that as a diver descends, the neoprene foam closed cells are crushed as conventionally occurs but, as the layer of water in the wool is substantially non, compressible, it is not crushed and hence the thickness of the layer and hence thermal efficiency and benefits are maintained for the diver.

Another important advantage is that as the water has a relatively high thermal inertia, it is able to absorb a large amount of heat which absorbs the heat emitted by the diver during periods of work, retains the same and emits the same back to the diver during periods of lower exercise.

A further result of the use of a wool layer in accordance with the invention is that the level of buoyancy loss as the diver descends is reduced in comparison to the conventional wetsuits. There is less requirement for inflation and deflation in use of the buoyancy compensator and an easier, more comfortable, and safer diving profile to be maintained by the diver. This can be particularly used to advantage if the layer of rubber foam is reduced in thickness and the layer of wool increased in thickness thereby retaining and improving the thermal efficiency of the wetsuit while at the same time improving the buoyancy of the wetsuit as the compressible element of the wetsuit is reduced.

The use of Merino breed wool is preferred as this gives greater advantage. Specifically, the Merino wool provides an exothermic reaction during the wetting process which can be referred to as the heat of sorption. Merino wool also has high wrinkle and crush recovery thus further enhancing the thermal properties. It is also known that the Merino wool is resistant to odour, hydrophilic, highly elastic with excellent recovery characteristics and relatively non itchy and comfortable in wet or dry condition which is obviously advantageous when the layer is to be positioned close to the skin. It is therefore preferred that the wool layer is formed of or contains elements of Merino wool therein, although it will be appreciated that this should not limit the scope of the patent application to this form of wool alone as all wools contain to some degree all of the aforementioned advantages.

Typically the wool is knitted to a weight of between around 50 to around 500 grammes per sq. meter but can be anything from as fine as less than 50 and upwards of 500. It is found that ribbed knit has typically better water absorbing properties than any other knit for a given weight of wool. So this tends to be the preferred knit. If required a small lycra blend (typically 1 to 2%) can significantly improve the elasticity and strength of the final knit without detracting from the thermal and other advantageous properties of the wool. In another feature the wool or wool blend can be knitted such that there is course/heavy/bulky weave to the back face, and a finer micron yarn to the face that will be onto the wearer's skin. This allows an increase in the bulk and, therefore the water absorption ability whilst still keeping a "soft" and non-itchy surface to the diver's skin.

Typically the Merino fibre is spun into yarn on a worsted spinning system and to ensure comfort next to the skin the fabric surface in contact with the skin is made from fibre with an average micron of finer than 19. As required, different yarn counts are used to achieve varying fabric weight and structures depending upon the final type of suit that the lining will be used in (i.e surface wetsuit, cold water wetsuit, warm water wetsuit, drysuit).

The Merino and lycra are blended at the knitting process to increase strength and stretch. Typically the blending is in the 1 to 40% range but this is not exclusive and blending with other synthetics may be employed to reduce costs. The knitting structures are selected which allow for maximum extension and recovery in both length and width direction. Structures selected may also vary in "end counts" and "picks". The structures are weft knitted from Rib and Double Knit machines, and the fabric weight typically ranges from approximately 50 gms or below through to upwards of 500 gms depending on the quality and function of the suit style. The yarn weight can be varied on each side of the weave in order to achieve weights in excess of 400 gms without impairing or compromising the soft fine feel next to the skin. These are particularly for use in drysuits and deep diving cold water wetsuits. Typically in order to achieve the desired fabric performance a process of heat setting the synthetic fibre such as "Lycra" is performed while maintaining very low extension during the dyeing and subsequent drying processes when preparing the wool blend.

The wetsuit structure in accordance with the invention therefore provides a solution to the thermal and buoyancy problems conventionally experienced.

When uses as an internal lining of a drysuit, advantages are obtained in that in its dry and natural state the crimp and bulk of the wool yarn is resilient and is less compressible than synthetic yarns so offers better thermal qualities in a diving situation. Also, as the drysuit is typically non-breathable it tends to hold body odour. The yarn of wool has surface scales that naturally open and close and thereby reduce to a minimum odour problems, rendering the garment more hygienic. The wool is naturally "exothermic" when water vapour is absorbed into the yarn structure. Thus as the diver perspires the perspiration causes a chemical reaction within the yarn emitting a significant amount of heat back to the diver. With Merino type wools this is particularly noticeable. As the wool dries after the diver has removed the suit the chemical reaction is reversed; so that this "exothermic" reaction is a sustainable ongoing advantage of a wool lined drysuit which is equally applicable to a wetsuit. The wools "Scaley" yarn fibre surface can work lock into the yarn up to 3.5 times its own weight in water without feeling "wet". This property offers probably the greatest advantage to a drysuit diver. A diver when diving is usually working quite hard and is perspiring. In a drysuit this perspiration can not leave the drysuit system the thermal underclothing is designed to "wick" moisture from the diver's skin but the problem is that this moisture then condenses on the inner surface of the outer drysuit. A diver in a one to two hour dive can perspire up to 1.0 to 1.5 liters of fluid if working hard. This would normally run into the boots of the suit and run back into the thermal underclothing, reducing the thermal efficiency if this clothing. The advantage as advised of the wool is that it can absorb up to 3.5 times its own weight; so in a wool lined drysuit where typically there are about 600 grammes of wool, then nearly 2 liters of perspiration can be absorbed. Moreover this absorption of water vapour/perspiration also swells the wool yarn effectively further enhancing its thermal efficiency.

The invention claimed is:

1. A suit to be worn by a person in contact with water, said suit having only three layers consisting of
a layer of substantially closed cell compressible material, an outer protective layer and a layer of wool, with other fibers or materials, which forms an inner layer of the suit in contact with the person and to contact and retain at least some of the liquid which enters the suit from any external source and/or from the person wearing the suit;
said inner layer being laminated to the layer of substantially closed cell compressible material and having a weight of between 50-500 grams per square meter such that the inner layer retains said liquid therein to form a substantially non-compressible, thermal barrier between said person and the layer of substantially closed cell compressible material of the suit and wherein the other fibers or materials include a wool synthetic yarn blend in a proportion of between 1% and 40% by weight of the overall weight of the yarn blend.

2. A suit according to claim 1 characterized in that the wool or wool with other fibers or material is positioned over portions of the suit which when worn lie at any or any combination of the torso, legs and/or arms of the wearer.

3. A suit according to claim 1 characterized in that the suit is a wetsuit and for at least a portion or portions of said suit, water can pass between the inner surface of the said outer layer of material and the person wearing the suit.

4. A suit according to claim 3 characterized in that the layer of wool with other fibers or material is provided at said portion or portions to lie between the person and the said layer of substantially closed cell compressible material.

5. A suit according to claim 4 characterized in that the layer of wool with other fibers or material comes into contact with water which enters the suit.

6. A suit according to claim 3 characterized in that the layer of wool with other fibers or material is provided wherever water is permitted to pass between the person and layer of material.

7. A suit material according to claim 1 wherein the layer of substantially closed cell compressible material of the suit is manufactured from a rubber foam material such as such as neoprene or chloroprene.

8. A suit according to any of the preceding claims characterized in that the wool which is used includes or is wholly, wool from the Merino breed of sheep.

9. A suit according to claim 1 characterized in that a the synthetic yarn added to the wool is at least partially elasticated to offer improved elasticity (stretch) and/or strength to the wool with other fibers or material.

10. A method of manufacturing a wetsuit or drysuit for use with water, said method consisting of forming a substantially compressible closed cell material to form a layer of a shape for wearing by a person, providing an outer protective layer thereon and an inner layer of wool containing material is provided to lie between the person and the layer of substantially compressible closed cell material when the suit is worn wherein said inner layer is of a weight of between 50 to 500 grams per square meter and is laminated to the inner surface of the layer of substantially compressible closed cell material so as to retain liquid from the person or liquid which has entered the suit from externally to form a substantially non-compressible thermal barrier between the person and the layer of substantially compressible closed cell material.

11. A method according to claim 10 characterized in that the method includes the step of laminating the wool material as a lining to the inner surface of the layer of substantially compressible closed cell material.

12. A method according to claim 11 characterized in that when in the form of a wetsuit the method includes the step of providing means in the said material to permit the flow of water between the inner surface of said layer and the persons skin when the wet suit is worn and providing control means to allow the control of the quantity of water.

13. A method according to claim 12 characterized in that the water passing into the area between the diver and the layer of material contacts and is absorbed by the wool or wool containing material.

14. A suit to be worn by a person in contact with water, said suit consisting of an outer layer of substantially closed cell compressible material, an outer protective layer and at least a portion of the suit includes a layer of wool blended with other fibers or materials, which forms an inner layer of the suit in contact with the person and said inner layer provided to contact and retain at least some of the liquid which enters the suit from an external source and/or from the person wearing the suit such that the inner layer retains the liquid therein to form a substantially non-compressible, thermal barrier between the said person and the layer of substantially compressible closed cell material and wherein said inner layer is laminated to the layer of substantially compressible closed cell material and provided of a weight of between 50-500 grams per square meter and the wool is blended with synthetic material in the range of 1-40% by weight of the overall weight of the layer.

* * * * *